April 18, 1933.  M. E. WEBSTER  1,904,035
FLY SCREEN
Filed June 11, 1932
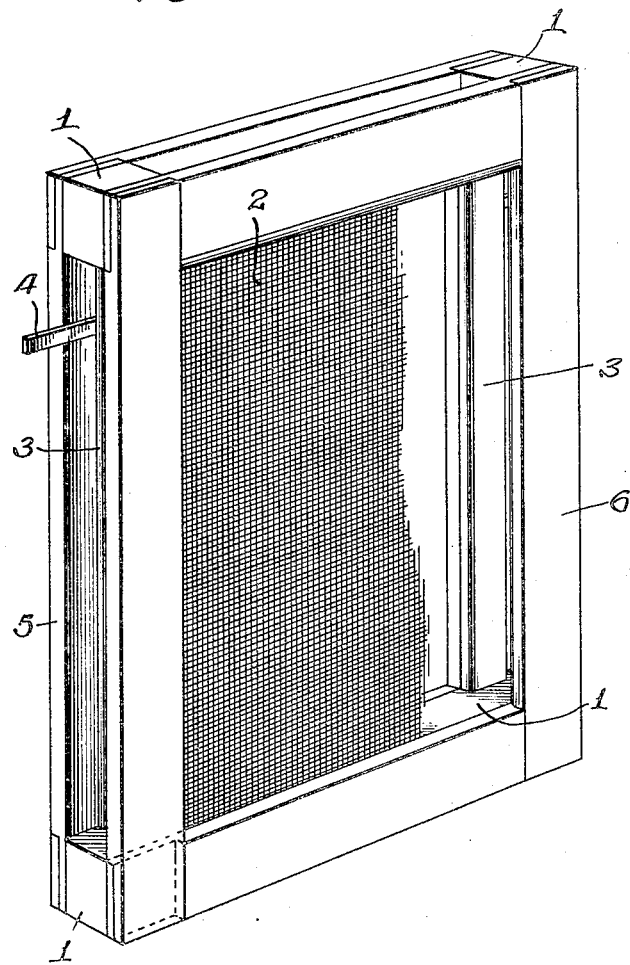
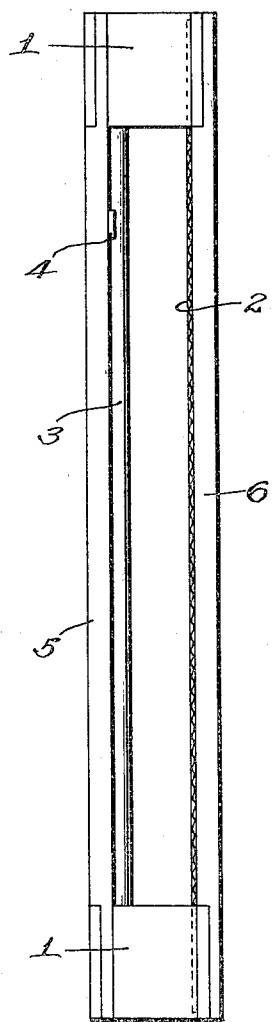
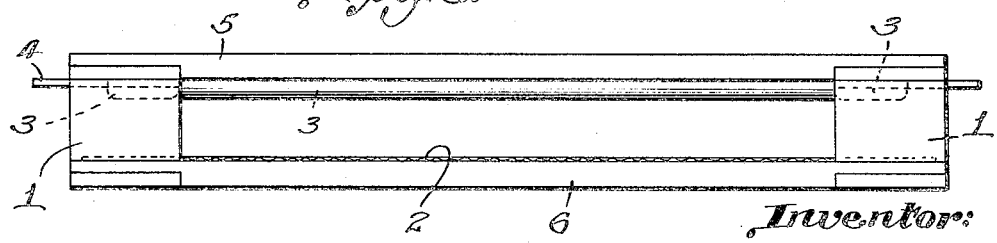
Inventor:
Mary E. Webster.

Patented Apr. 18, 1933

1,904,035

UNITED STATES PATENT OFFICE

MARY ELIZA WEBSTER, OF DUNCAN, OKLAHOMA

FLY SCREEN

Application filed June 11, 1932. Serial No. 616,616.

The invention relates to improvements in fly screens, in which two frames are connected by standards, or bolsters, between them: and the objects of the improvements are, first, to prevent flies and mosquitoes from entering the house, second, to provide a way for flies and mosquitoes to get out of the house.

The invention is illustrated in the accompanying drawing, in which Fig. 1 is the whole structure as it appears, ready to be attached to the opening to be screened.

Fig. 2 is a lengthwise elevational view and Fig. 3 is a top plan view.

The wire screen 2 which is of ordinary construction, is attached to the inside of frame 6. There is nothing used to cover the edge of the wire, as that would hinder the fly from seeing his way out.

The bolsters 1, 1, 1, that connect the two frames 5 and 6, may be blocks, as illustrated, or bolts, or anything that will hold the two frames far enough apart to permit the flies to escape between them.

The supporting frame 5, has a fly stop 3, which may be a strip of moulding, to prevent flies that alight on the outside of the building from seeing how to get into the house. The fly stops should be about one fourth of an inch thick for best results. The thickness of the frame 6, prevents flies on the outside of the screen from seeing the opening. Catches 4, 4, hold the structure in the right place.

The bolsters 1, 1, 1, hold the screen 2, about three fourths of an inch from the fly stops.

The fly stops should be trimmed to fit between the bolsters.

In order to make a double duty fly screen effective, the peculiar anatomy of insects must be considered; also the position of the fly's body as he approaches the opening from either side of the screen.

An insect's head is so set on its body that it cannot turn its head to look backward. Insects see only straight before them, or toward their feet. When they approach an obstruction that reaches past their heads they do not attempt to cross it. They either drop backward or fly away.

This screen has nothing to be crossed going out, and it has a stop that flies will not cross to get in. This arrangement is peculiar to a screen having two frames.

In a one frame screen, the fly that crawls to the opening on the outside of the wire is in just the right position to see into the house through the opening, while in the two frame screen, the fly that crawls to the opening from the building, beside the screen, is in a position to see outward through the wire screen. He cannot see that the opening leads into the house. The fly on the outside of the wire cannot see the opening at all.

When a screen having one frame is fitted into the opening to be screened, the surrounding structure will cover the opening in the top of the frame, so that it cannot be seen by the fly on the inside of the screen until he reaches the opening, and when there is a support imposed against the inside of the wire screen, there is not much chance for the fly on the inside to find the opening.

To obviate this difficulty, this invention has one frame 5, to be fitted into the opening to be screened, and another frame 6, to which the wire screen is attached; the two frames being opposite one to the other, and held apart by bolsters, so that the fly can pass out between the two frames.

Another difficulty in a one frame construction, is the necessity of having the wire screen fastened to the outside of the frame, which gives the fly on the outside a better chance to get into the house than the fly on the inside has to get out.

Every fly on the inside of the two frame screen can get out, and not a fly crawling on the outside of the two frame screen can get in.

I am aware that prior to my invention, fly screens have been made to prevent flies from entering the building. I therefore do not claim the invention of a fly screen broadly.

I claim:

1. A fly screen having two frames, opposite one to the other, bolsters between them, one frame to fit the opening to be screened, and to support the outer, or screen bearing frame, at a sufficient distance from the surrounding structure, to leave fly exits between the two frames, so that said exits may be seen by every fly on the inside of the screen, while the exits are behind the frame, and out of sight, to every fly on the outside of the wire screen.

2. In the device of claim 1, fly stops attached to the inner or supporting frame and behind the back of the outgoing fly to prevent flies which may be resting on the building beside the screen from seeing and using the exits.

MARY ELIZA WEBSTER.